(12) United States Patent
Miller et al.

(10) Patent No.: US 7,492,998 B2
(45) Date of Patent: Feb. 17, 2009

(54) FIBER BUNDLES AND METHODS OF MAKING FIBER BUNDLES

(75) Inventors: William J. Miller, Horseheads, NY (US); M. Heath Rasmussen, Millport, NY (US); Luis A. Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 10/930,294

(22) Filed: Aug. 31, 2004

(65) Prior Publication Data
US 2006/0045444 A1 Mar. 2, 2006

(51) Int. Cl.
*G02B 6/04* (2006.01)
*G02B 6/06* (2006.01)

(52) U.S. Cl. ...................... 385/116; 385/115
(58) Field of Classification Search ......... 385/115–121; 65/406, 409, 410; 264/1.28; 362/554
See application file for complete search history.

(56) References Cited

U.S. PATENT DOCUMENTS

| | | | | |
|---|---|---|---|---|
| 2,992,956 A | * | 7/1961 | Bazinet, Jr. ................ 156/73.2 |
| 3,590,248 A | | 6/1971 | Chatterton, Jr. ............ 250/199 |
| 3,626,040 A | | 12/1971 | Nagao et al. ................... 264/1 |
| 3,779,729 A | | 12/1973 | Hicks, Jr. ......................... 65/4 |
| 3,819,442 A | | 6/1974 | Brushenko .................. 156/180 |
| 3,990,875 A | | 11/1976 | Hopkins ............................ 65/4 |
| 4,011,007 A | | 3/1977 | Phaneuf et al. ............... 350/96 |
| 4,853,020 A | | 8/1989 | Sink ............................. 65/4.1 |
| 4,902,324 A | | 2/1990 | Miller et al. ................. 65/3.11 |
| 5,009,692 A | | 4/1991 | Miller et al. ................. 65/3.11 |
| 5,011,251 A | | 4/1991 | Miller et al. ............. 350/96.15 |
| 5,017,206 A | | 5/1991 | Miller et al. ................. 65/3.11 |
| 5,030,000 A | * | 7/1991 | Kanda ........................... 356/40 |
| 5,073,048 A | | 12/1991 | Adachi et al. ................ 385/115 |
| 5,104,434 A | | 4/1992 | Berkey et al. ................ 65/3.11 |
| 5,251,276 A | | 10/1993 | Berkey et al. ................. 385/43 |
| 5,295,205 A | | 3/1994 | Miller et al. .................... 385/1 |
| 5,303,373 A | | 4/1994 | Harootian, Jr. .............. 385/115 |
| 5,339,372 A | | 8/1994 | Miller et al. ................... 385/29 |
| 5,351,326 A | | 9/1994 | Miller .......................... 385/43 |
| 5,381,501 A | | 1/1995 | Cardinal ....................... 385/54 |
| 5,394,493 A | | 2/1995 | Ames ........................... 385/35 |
| 5,473,716 A | | 12/1995 | Lebby et al. .................. 385/54 |
| 5,550,945 A | | 8/1996 | Gregory ...................... 385/116 |

(Continued)

FOREIGN PATENT DOCUMENTS

GB 2191873 A * 12/1987

(Continued)

*Primary Examiner*—Charlie Peng
(74) *Attorney, Agent, or Firm*—Svetlana Z. Short; Timothy M. Schaeberle

(57) ABSTRACT

The present invention relates to fiber bundles and methods for making fiber bundles. According to one embodiment of the invention, at the endface of the fused fiber bundle, the ratio of the cross-sectional area of the endface to the cross sectional area of the plurality of optical fibers is at least about 2.5. According to another embodiment of the invention, a fused fiber bundle includes a plurality of optical fibers, and a glass tube surrounding the terminal segments of the optical fibers, wherein the refractive index of the glass tube is less than the refractive index of the claddings of the optical fibers. Other embodiments of the present invention provide methods for making fused bundles.

23 Claims, 10 Drawing Sheets

U.S. PATENT DOCUMENTS

| | | | |
|---|---|---|---|
| 5,754,720 A | 5/1998 | Quinn et al. | 385/43 |
| 5,864,644 A | 1/1999 | DiGiovanni et al. | 385/43 |
| 5,881,189 A | 3/1999 | Carberry et al. | 385/39 |
| 5,889,908 A | 3/1999 | Miller | 385/46 |
| 5,935,288 A | 8/1999 | DiGiovanni et al. | 65/408 |
| 5,956,443 A | 9/1999 | Carberry et al. | 385/43 |
| 6,061,490 A | 5/2000 | Sera et al. | 385/115 |
| 6,091,872 A | 7/2000 | Katoot | 385/116 |
| 6,092,394 A | 7/2000 | Backer et al. | 65/377 |
| 6,106,162 A | 8/2000 | Mrakovich et al. | 385/88 |
| 6,125,224 A | 9/2000 | Benzel | 385/114 |
| 6,243,520 B1 | 6/2001 | Goldman | 385/115 |
| 6,272,115 B1 | 8/2001 | Sekiguchi | 372/6 |
| 6,349,572 B1 | 2/2002 | Meini et al. | 65/410 |
| 6,397,636 B1 | 6/2002 | DiGiovanni et al. | 65/395 |
| 6,499,886 B1 | 12/2002 | Mizuno et al. | 385/70 |
| 6,614,972 B1 | 9/2003 | Lundin | 385/121 |
| 6,990,278 B2 * | 1/2006 | Vakili et al. | 385/46 |
| 2001/0031115 A1 | 10/2001 | Chen et al. | 385/54 |
| 2002/0168158 A1 | 11/2002 | Furusawa et al. | 385/116 |
| 2004/0033037 A1 | 2/2004 | Suzuki et al. | 385/115 |
| 2005/0105854 A1 * | 5/2005 | Dong et al. | 385/46 |

FOREIGN PATENT DOCUMENTS

| | | |
|---|---|---|
| JP | 60-140203 | 7/1985 |
| JP | 07-056027 | 3/1995 |
| JP | 2000-002815 | 1/2000 |
| JP | 2000-002826 | 1/2000 |

* cited by examiner

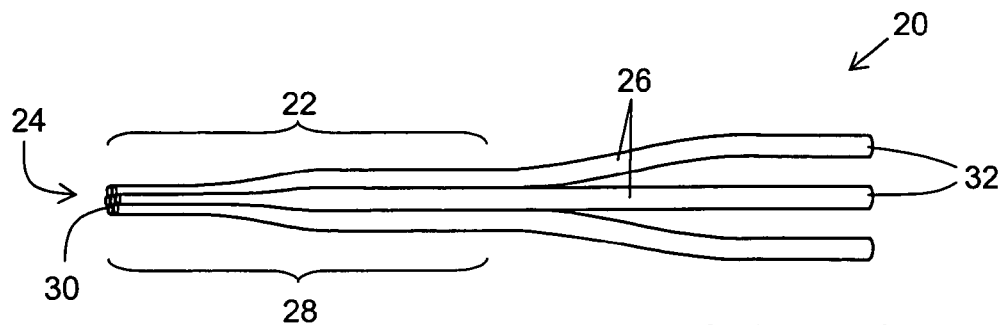
FIG. 1 – PRIOR ART
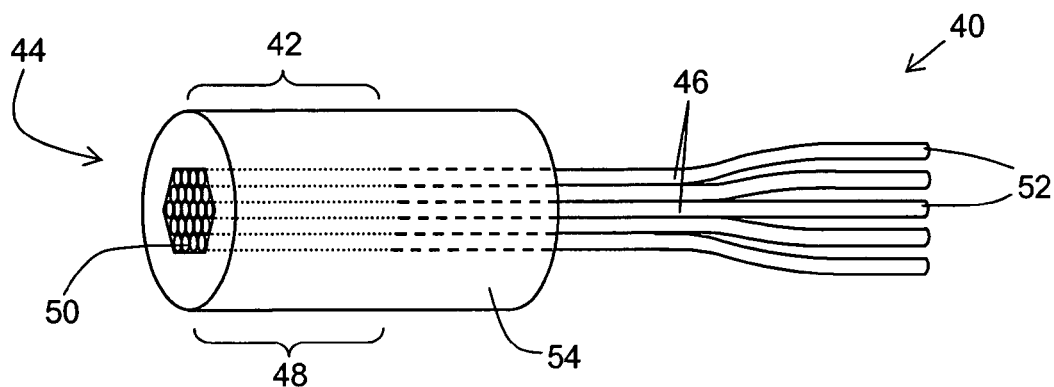
FIG. 2
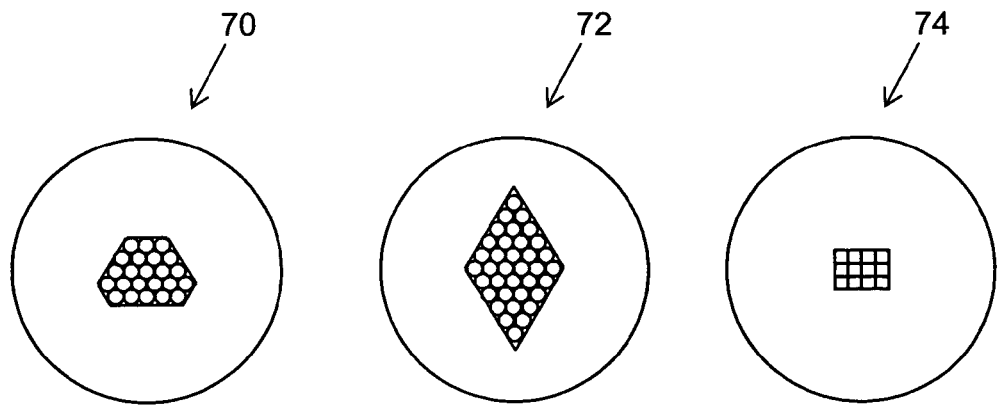
FIG. 3

FIBER BUNDLES AND METHODS OF MAKING FIBER BUNDLES

BACKGROUND OF THE INVENTION

1. Field of the Invention

The present invention relates generally to devices for transporting light. More specifically, the invention relates to fiber bundles and methods for making fiber bundles.

2. Technical Background

In the fields of optical communication, laser machining, an optical sensing, it is often desirable to combine optical power from several sources into a single beam. For example, in sensing applications, a fiber bundle can be used to combine optical power of different wavelengths from different laser or lamp sources into a single beam. In certain high-power applications, a fiber bundle can combine optical power from several identical sources into a single beam of relatively high power. Fiber bundles may also be used to divide light from a single source into a plurality of beams, or to reshape a beam in order to couple it between different optical devices.

A conventional fiber bundle is shown in FIG. 1. Fiber bundle 20 has a terminal section 22, and an endface 24. Fiber bundle 20 includes a plurality of optical fibers 26, each of which has a terminal segment 28 ending with a proximal end 30, and a distal end 32. The terminal segments 28 of optical fibers 26 are arranged substantially in parallel, and are affixed to one another (e.g., with adhesive or by fusion) to form the terminal section 22 of fiber bundle 20. The proximal ends 30 of optical fibers 26 are presented at the endface 24 of fiber bundle 20. In order to reduce the size of the beam, it may be desirable to taper the terminal section of the fiber bundle, as shown in FIG. 1.

However, conventional fiber bundles have certain disadvantages. For example, especially in tapered fiber bundles, the terminal section of the fiber bundle is often very small and very fragile, making it difficult to handle and prone to breakage. Further, the outermost fibers of a conventional fiber bundle can separate from the interior fibers, causing both a physical fraying of the fiber bundle, and a corresponding fraying of the optical beam. Since it is difficult to remove airspace between fibers at the endface of the fiber bundle, polishing and AR coating of the endface can be complicated by the presence of particulate matter in any airspace.

There remains a need for durable, handleable fiber bundles and methods for making such fiber bundles.

SUMMARY OF THE INVENTION

One embodiment of the present invention relates to a fused fiber bundle having a terminal section ending with an endface, the fused fiber bundle including a plurality of optical fibers, each of the optical fibers having a terminal segment ending with a proximal end, and a distal end; and a glass tube surrounding the terminal segments of the optical fibers; wherein the terminal segments of the optical fibers are arranged substantially in parallel, wherein the terminal segment of each of the optical fibers is substantially fused to any adjacent optical fibers and the terminal segment of each optical fiber adjacent to the glass tube is substantially fused thereto, thereby forming the terminal section of the fused fiber bundle, and wherein the glass tube is a thick-walled tube, such that at the endface of the fused fiber bundle, the ratio of the cross-sectional area of the endface to the cross sectional area of the plurality of optical fibers is at least about 2.5.

Another embodiment of the present invention relates to a fused fiber bundle having a terminal section ending with an endface, the fused fiber bundle including a plurality of optical fibers, each of the optical fibers having a terminal segment ending with a proximal end, and a distal end; and a glass tube surrounding the terminal segments of the optical fibers; wherein the terminal segments of the optical fibers are arranged substantially in parallel, and are substantially fused to one another and to the glass tube to form the terminal section of the fused fiber bundle, and wherein the refractive index of the glass tube is less than the refractive index of the claddings of the optical fibers.

Another embodiment of the present invention relates to a method of making a fused fiber bundle, the method including the steps of providing a plurality of optical fibers, each of the optical fibers having a fusible segment and a distal end; optionally providing at least one spacing member; providing a glass tube having an inner bore formed therein, the inner bore having a geometry adapted to closely fit the fusible segments of the plurality of optical fibers and the optional at least one spacing member; inserting the fusible segments of the optical fibers and the optional at least one spacing member into the inner bore of the glass tube in a substantially parallel arrangement; heating the glass tube in the region surrounding the fusible segments of the optical fibers, so that the glass tube fuses to the outermost fibers, and so that neighboring fibers and optional spacing members fuse to one another, thereby forming a fused region; and cutting the fused region to expose an endface, thereby forming the fused fiber bundle.

Another embodiment of the present invention relates to a method of making a fiber bundle, the method including the steps of providing a plurality of optical fibers, each of the optical fibers having an affixible segment and a distal end; optionally providing at least one spacing member; providing a glass tube having an inner bore formed therein, the inner bore having a geometry adapted to closely fit the affixible segments of the plurality of optical fibers and the optional at least one spacing member; inserting the affixible segments of the optical fibers and the optional at least one spacing member through a cellular arrangement tool and into the bore of the glass tube in a substantially parallel arrangement; affixing each of the affixible segments of the optical fibers to any adjacent optical fibers and any adjacent optional spacing members, and affixing to the glass tube the affixible segment of each of the optical fibers adjacent thereto, thereby forming an affixed region; and separating the affixed region to expose an endface, thereby forming the fiber bundle.

Another embodiment of the invention relates to a method of making a fiber bundle, the method including the steps of providing a plurality of optical fibers, each of the optical fibers having an affixible segment and a distal end; optionally providing at least one spacing member; providing a glass tube having an inner bore formed therein, the inner bore having a geometry adapted to closely fit the affixible segments of the plurality of optical fibers and the optional at least one spacing member; inserting the affixible segments of the optical fibers and the optional at least one spacing member into the bore of the glass tube in a substantially parallel arrangement, the step of inserting comprising a plurality of sub-steps, wherein less than all of the optical fibers are inserted in each sub-step; affixing each of the affixible segments of the optical fibers to any adjacent optical fibers and any adjacent optional spacing members, and affixing to the glass tube the affixible segment of each of the optical fibers adjacent thereto, thereby forming an affixed region; and separating the affixed region to expose an endface, thereby forming the fiber bundle.

The devices and methods of the present invention result in a number of advantages over prior art devices and methods. For example, the fiber bundles of the present invention can be made to be durable and handleable, and easily fixtured in a device. Embodiments of the present invention having a lower index glass tube can provide an output beam having a desired numerical aperture. The methods of the present invention allow the skilled artisan to construct fiber bundles having a large number of optical fibers in a desired, well-controlled geometrical arrangement.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. For example, for the sake of clarity, not all distal ends of the optical fibers are shown in the drawings. The drawings illustrate one or more embodiment(s) of the invention, and together with the description serve to explain the principles and operation of the invention.

BRIEF DESCRIPTION OF THE DRAWINGS

FIG. 1 is a schematic view of a conventional fiber bundle;

FIG. 2 is a schematic view of a fused fiber bundle according to an embodiment of the present invention;

FIG. 3 is a cross-sectional view of a few examples of fused fiber bundles according to an embodiment of the present invention;

DETAILED DESCRIPTION OF THE INVENTION

Figure 4:
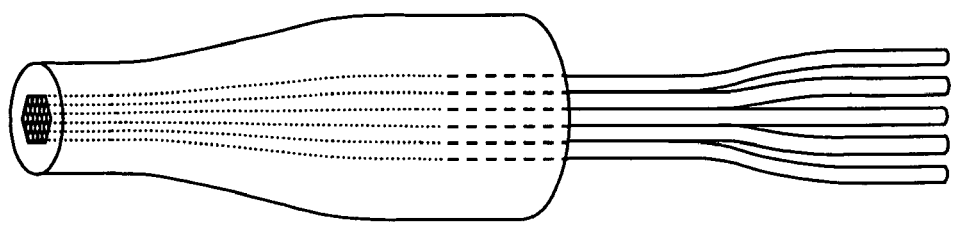
FIG. 4 is a schematic view of a tapered fused fiber bundle according to the present invention.

An example of a fused fiber bundle according to one embodiment of the present invention is shown in schematic view in FIG. 2. Fused fiber bundle 40 has a terminal section 42, and an endface 44. Fiber bundle 40 includes a plurality of optical fibers 46, each of which has a terminal segment 48 ending with a proximal end 50, and a distal end 52. The terminal segments 48 of optical fibers 46 are arranged substantially in parallel, and are surrounded by a glass tube 54. The terminal segments 48 of optical fibers 46 are substantially fused to one another and to the glass tube 54 to form the terminal section 42 of fused fiber bundle 40. The skilled artisan will appreciate that the terminal segment 48 of each and every optical fiber 46 is not necessarily substantially fused to the terminal segment 48 of each and every other optical fiber 46; rather, the terminal segment 48 of each optical fiber 46 is substantially fused to the terminal segments 48 of any neighboring optical fibers 46. The skilled artisan will likewise appreciate that the terminal segment 48 of each and every optical fiber 46 is not necessarily fused to the glass tube 54; rather, the terminal segment 48 of each optical fiber 46 adjacent to the glass tube 54 is fused thereto. The proximal ends 50 of optical fibers 46 are presented at the endface 44 of fiber bundle 40, so that optical power may be coupled into or out of them.

According to the embodiment of FIG. 2, the glass tube 54 is a thick-walled tube, such that at the endface of the fused fiber bundle, the ratio of the cross-sectional area of the whole endface 44 to the cross-sectional area of the proximal ends 50 of the optical fibers 46 is at least about 2.5. Desirably, the ratio of the cross-sectional area of the whole endface 44 to the cross-sectional area of the proximal ends 50 of the optical fibers 46 is at least about 4. More desirably, the ratio of the cross-sectional area of the whole endface 44 to the cross-sectional area of the proximal ends 50 of the optical fibers 46 is at least about 7. In certain especially desirable embodiments of the invention, the ratio of the cross-sectional area of the whole endface 44 to the cross-sectional area of the proximal ends 50 of the optical fibers 46 is at least about 10, at least about 15, or even at least about 20. The skilled artisan will appreciate that while the outlines of the proximal ends of the individual optical fibers may not be visible at the endface, the ratio of cross-sectional areas can be determined using, for example, the cross-sectional areas of the glass tube and the terminal segments of the optical fibers before fusion, and correcting for any distortion that occurs during fusion.

The fused fiber bundles of the present invention can be made with a variety of numbers of optical fibers arranged in a variety of ways. The methods according to certain embodiments of the present invention, described below, use a glass tube having a shaped inner bore to allow large numbers of optical fibers to be arranged in a fused fiber bundle having a tightly-controlled geometry (i.e., the overall shape of the grouping of optical fibers) and lattice type (i.e., the spatial relationship of neighboring optical fibers). For example, the fused fiber bundles of the present invention can comprise at least 4 optical fibers. In certain desirable embodiments of the invention, the fused fiber bundle comprises at least 10 optical fibers. In other desirable embodiments of the invention, the fused fiber bundle comprises at least 15 optical fibers. The optical fibers can be arranged, for example, in a triangular lattice or a square lattice. The skilled artisan will appreciate that the methods of the present invention enable the formation of fused fiber bundles having a wide variety of regular and irregular polygonal geometries. For example, the optical fibers can be arranged in geometries such as diamond-shaped, triangular, hexagonal, trapezoidal and rectangular. Examples of fused fiber bundles according to the present invention are shown in cross-sectional sectional view in FIG. 3. For example, fused fiber bundle 70 has 23 optical fibers arranged in triangular lattice in an irregular hexagonal geometry, and fused fiber bundle 72 has 36 optical fibers arranged in a triangular lattice in a diamond-shaped geometry. The optical fibers need not be cylindrical in shape; rather, they can have any shape, e.g., rectangular, square, or D-shaped. For example, fused fiber bundle 74 has 12 square cross-section optical fibers arranged in a square lattice in a rectangular geometry.

The fused fiber bundles of the present invention desirably have substantially no organic material (e.g., adhesive) between adjacent optical fibers and between the optical fibers and the thick-walled tube. Instead, optical fibers are desirably fused to one another and to the thick-walled tube by heating them and allowing their glassy outer surfaces to intermingle. The absence of organic material can increase durability, can allow the fused fiber bundles of the present invention to handle high optical powers without concern for the stability of the adhesive, and can simplify polishing and tapering operations.

The fused fiber bundles of the present invention are desirably fully collapsed, so that substantially no airspace remains in the terminal section of the fused fiber bundle. A fully collapsed fused fiber bundle will have substantially no airspace remaining between adjacent optical fibers, and between the optical fibers and the thick-walled tube. Methods to fully collapse the fused fiber bundles of the present invention are described below. A fully collapsed fused fiber bundle can be advantageous, as there exists substantially no airspace between optical fibers in which particulate matter can become lodged during polishing and processing operations. Fully collapsed fused fiber bundles can therefore be much easier to successfully AR coat than are conventional fiber bundles. Methods for fully collapsing fused fiber bundles are described in more detail below.

In order to decrease the size of the beam of optical energy emitted during operation by the endface of the fused fiber bundle, it may be desirable for the fused fiber bundle to be tapered, as shown in schematic view in FIG. 4. Tapering can also increase the divergence of the emitted beam. The skilled artisan will use standard heating and drawing methods to provide the tapered fused fiber bundles of the present invention.

The distal ends of the optical fibers can be adapted to be coupled to the desired sources of optical energy. For example, the distal ends of the optical fibers can be lensed, or can be fitted with GRIN collimators. Lensed fibers are available from Corning Incorporated of Corning, N.Y. Alternatively, the distal ends of the optical fibers can be pigtailed to the desired sources, or can be themselves formed into a fiber bundle. The skilled artisan will appreciate that the distal ends of the fibers can be individually adapted in different ways.

Figure 5:
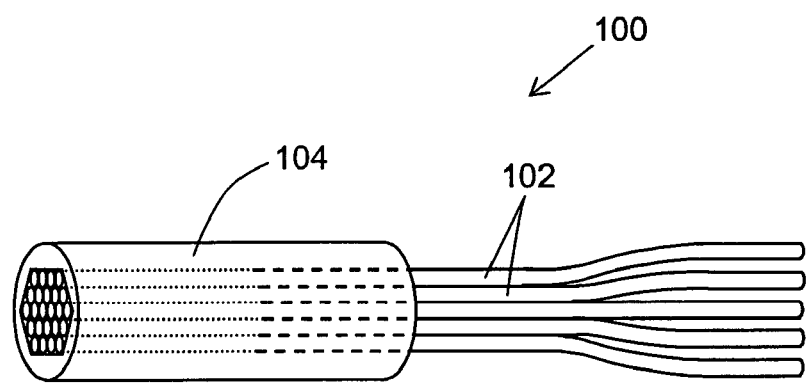
FIG. 5 is a schematic view of a fused fiber bundle according to another embodiment of the present invention.

Another embodiment of the present invention is shown in schematic view in FIG. 5. In this embodiment of the invention, fused fiber bundle 100 is constructed from a plurality of optical fibers 102 (each inherently having a core and a cladding) and a glass tube 104. The glass tube has a refractive index that is less than the refractive index of the claddings of the optical fibers. For example, the difference between the refractive index of the claddings of the optical fibers and the refractive index of the glass tube may be at least 0.005. Desirably, the difference between the refractive index of the claddings of the optical fibers and the refractive index of the glass tube is at least 0.01. In certain desirable embodiments of the invention, the difference between the refractive index of the claddings of the optical fibers and the refractive index of the glass tube is at least 0.02. A lower index glass tube surrounding the optical fibers may be advantageous, in that it can help provide enhanced light-guiding properties to the terminal section of the fused fiber bundle, and can be used to tailor the numerical aperture of the beam of optical energy emitted during operation by the endface of the fused fiber bundle. A lower index glass tube may be especially advantageous in tapered fused fiber bundles, because it can account for the fact that the tapering process tends to lower the index contrast of the individual optical fibers, thereby causing a diminution in their guiding properties. The glass tube is desirably a thick-walled tube, as described above.

The fused fiber bundles of the present invention are desirably large enough in cross-section to be handleable and durable. For example, the terminal section of a fused fiber bundle of the present invention is desirably at least about 1 mm in diameter, or about 0.78 mm$^2$ in cross-sectional area. In certain desirable embodiments of the invention, the terminal section of a fused fiber bundle is at least about 2 mm in diameter or about 3.14 mm$^2$ in cross-sectional area. The skilled artisan will appreciate that for tapered fused fiber bundles, it will be necessary to use a glass tube having somewhat larger dimensions to provide a tapered section having a desirably large diameter or cross-sectional area.

As the skilled artisan will appreciate, the fused fiber bundles of the present invention can be made with a variety of types of optical fibers. For example, the optical fibers can be single-mode or multi-mode, can be made of silica glass or of other types of glass, and can be of different types or the same type. The optical fibers can be of a standard size (e.g., about 125 μm in diameter), or can have reduced cladding thickness and smaller size (e.g., about 80 μm in diameter). Similarly, the optical fibers can have a non-standard core size (e.g., 105 μm core diameter, 125 μm fiber diameter). The glass tube can be of any material, and is desirably selected to be compatible with the optical fibers (e.g. fusible, lower refractive index). Desirably, the glass tube is similar in hardness (e.g., within 30%, or even within 10%) to the material of the optical fibers, in order to provide good polishing characteristics. The glass tube is also desirably similar in coefficient of thermal expansion (e.g., within 30%, or even within 10%) to the material of the optical fibers, in order to provide mechanical stability and reliability and to minimize polarization effects. Desirably, the glass tube is made from substantially the same material as are the optical fibers (e.g., silica).

Another embodiment of the present invention relates to a method of making a fused fiber bundle. The skilled artisan can adapt known techniques for making overclad couplers, such as those described in U.S. Pat. Nos. 4,902,324; 5,009,692; 5,011,251; 5,017,206; 5,251,276; 5,295,205; 5,339,372; 5,351,326; 5,881,189; 5,889,908; 5,956,443; and 6,092,394, each of which is hereby incorporated herein by reference in its entirety. An example of a method of making a fused fiber bundle according to the present invention is shown in schematic view in FIG. 6. A plurality of optical fibers 120, each having a fusible segment 122 and a distal end 126, is provided. Optionally, at least one spacing member 128 is provided. A glass tube 130, having an inner bore 132 is also provided. The inner bore 132 has a geometry adapted to closely fit the plurality of optical fibers and the optional at least one spacing member. The shape of the inner bore 132 is desirably selected to provide the desired geometrical arrangement to the fusible segments 122 of the optical fibers 120, as well as to provide the desired spatial relationship between neighboring optical fibers.

To fabricate the fused fiber bundle from the provided parts, the fusible segments 122 of the optical fibers and the at least one optional spacing member 128 are inserted into the inner bore 132 of the glass tube 130 in a substantially parallel arrangement. The glass tube 130 is heated in the region surrounding the inserted fusible segments 122, so that the fusible segment of each of the optical fibers is substantially fused to any adjacent optical fibers and the fusible segment of each optical fiber adjacent to the glass tube is substantially fused thereto, thereby forming fused section 134. The fused section 134 is then separated to expose an endface 136, thereby forming a fused fiber bundle 140 having a terminal section 142, and an endface 136. Fiber bundle 140 comprises the plurality of optical fibers 120, each of which has a terminal segment 148 ending with a proximal end 150, and the distal end 126. The terminal segments 148 of optical fibers 120 are arranged substantially in parallel, and are surrounded by the glass tube 130. The fusible segment 148 of each optical fibers 120 is substantially fused to any adjacent optical fibers or spacing members, and the fusible segment of each optical fiber adjacent to the glass tube is substantially fused thereto in the terminal section 142 of fused fiber bundle 140. The separation of the fused section 134 creates proximal ends 150 of optical fibers 120, which are presented at the endface 136 of fiber bundle 140, so that optical power may be coupled into them.

Figure 6:
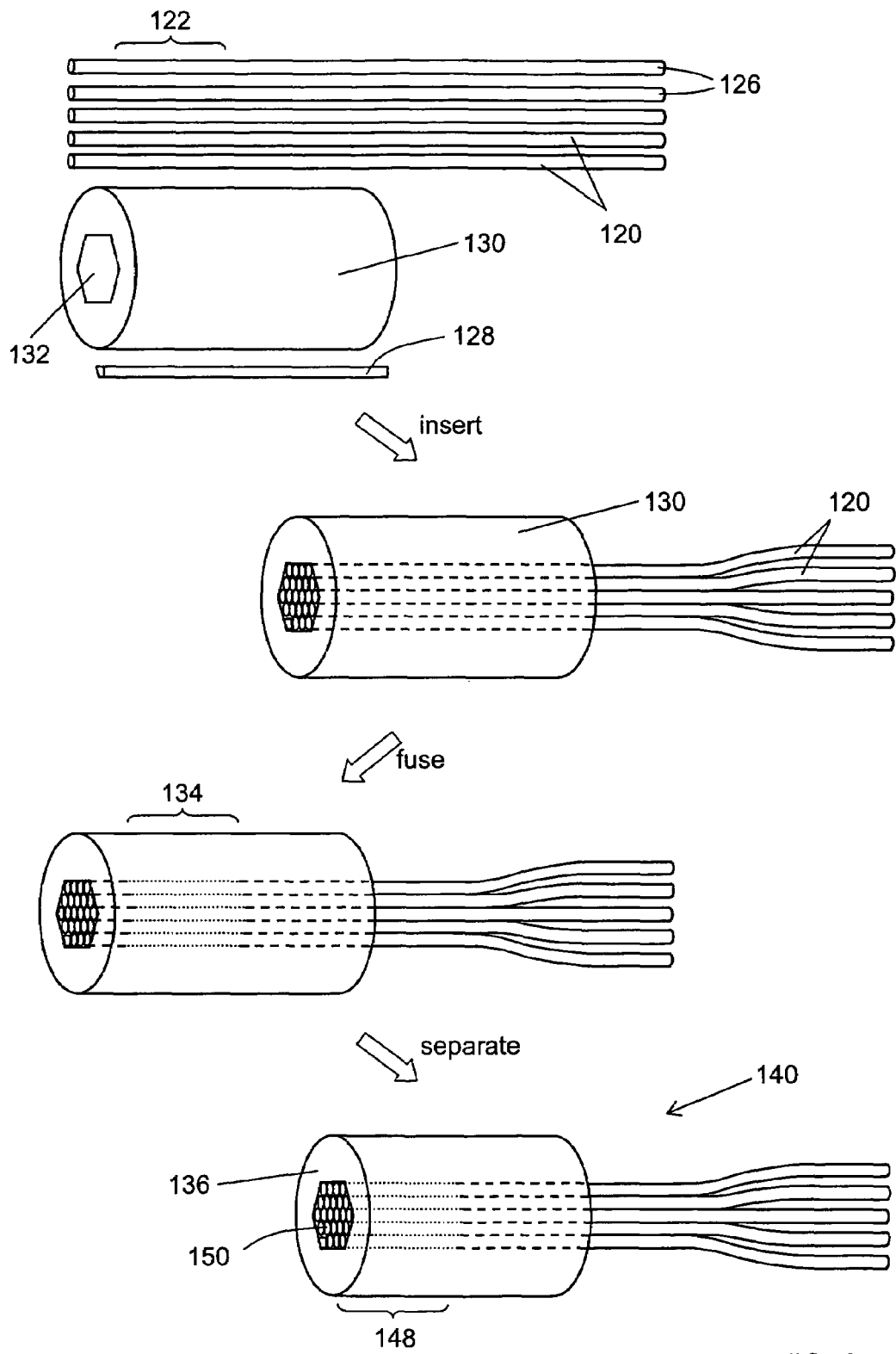
FIG. 6 is a schematic view of a method of making a fused fiber bundle according to an embodiment of the present invention.
Figure 7:
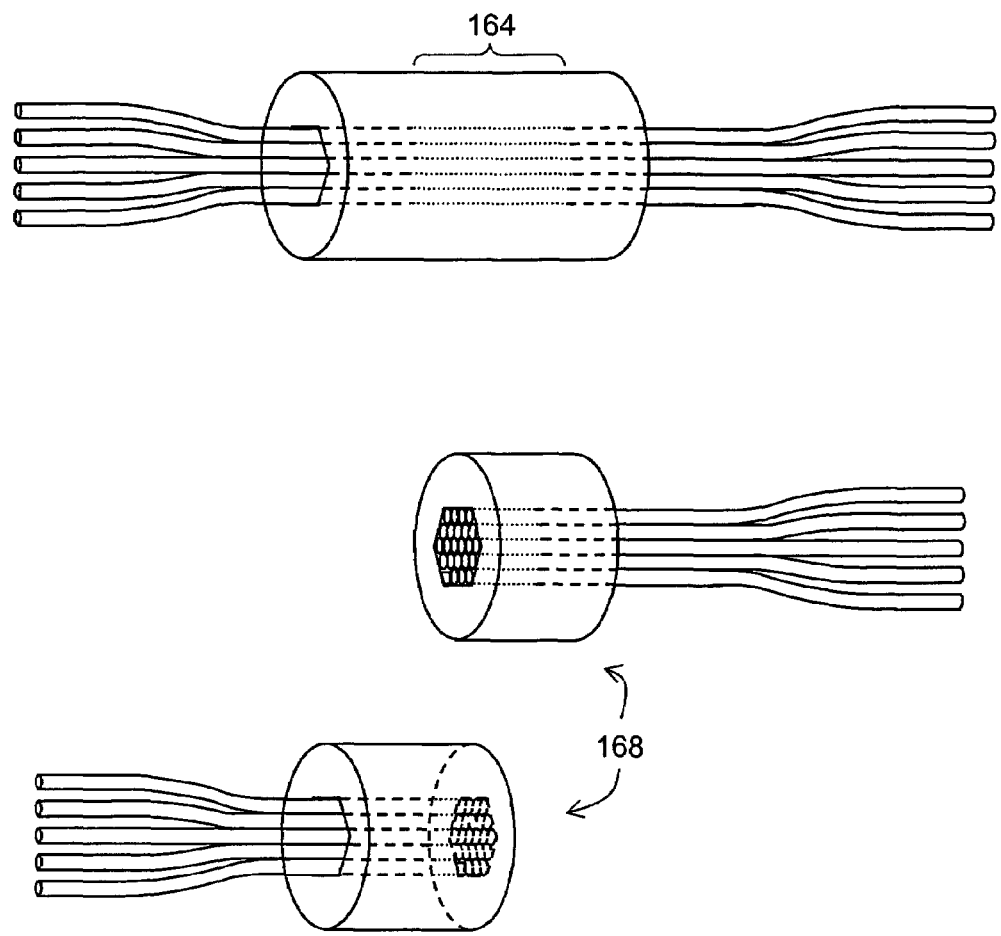
FIG. 7 is a schematic view of a method of making a fused fiber bundle using interior segments of optical fibers according to an embodiment of the present invention.

The optical fibers may be of any desirable type, as described above. The fusible segments of the optical fibers are desirably stripped of any polymer coating to enable close spacing of the terminal segments in the inner bore of the glass tube and to provide an organic-free fused region. The fusible region may be formed near an end segment of the optical fibers, as shown in FIG. 6, or may be formed in an interior segment of the optical fibers 162, as shown in schematic view in FIG. 7. Using an interior segment of the optical fibers as the fusible segment may be advantageous, because separation of the fused section 164 can then yield two fused fiber bundles 168.

The inner bore of the glass tube can have a variety of geometries, depending on the desired geometry of the fused fiber bundle. For example, the inner bore can be diamond-shaped, triangular, hexagonal, trapezoidal or rectangular, or could have a more complex cross-sectional shape. The skilled artisan can use any convenient method to provide the glass tube. For example, a graphite rod having the desired cross-sectional shape of the inner bore can have glass deposited and consolidated on it, as described in U.S. patent application Ser. No. 10/232,099, filed Aug. 29, 2002, which is hereby incorporated by reference in its entirety. Tubes having non-circular inner bores are also commercially available, e.g. from Heraeus and Friedrich & Dimmock. The skilled artisan can use glass drawing techniques to reduce the cross-sectional area of the inner bore, and can fuse concentric tubes together to increase the cross-sectional area of the glass tube.

Figure 8:
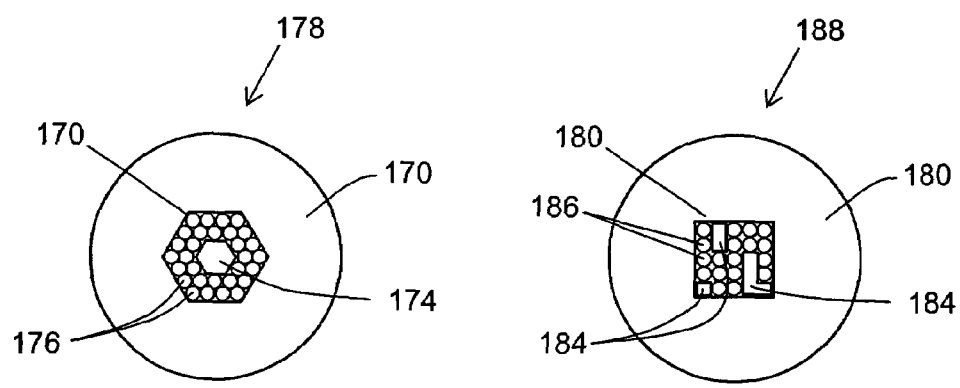
FIG. 8 is a schematic view of methods using optional spacing members to tailor the beam output from the fused fiber bundle according to an embodiment of the present invention.

The optional spacing members can be used by the skilled artisan in combination with the geometry of the inner bore of the glass tube to define a desired geometry of optical fibers in the fused fiber bundle. For example, as shown in cross-sectional schematic view in FIG. 8, a glass tube 170 having a hexagonal inner bore 172 can be used in combination with a smaller hexagonal spacing member 174 to give a hexagonal annular geometrical arrangement of optical fibers 176 in fused fiber bundle 178. Similarly, a glass tube 180 having a square inner bore 182 can be used in combination with a plurality of spacing members 184 to yield a complex geometrical arrangement of optical fibers 186 in fused fiber bundle 188. The use of spacing members in fabricating the fused fiber bundles of the present invention can allow the skilled artisan to form a complex beam to match a desired optical device. However, for the sake of simplicity and ease of manufacture, in certain desirable embodiments of the invention no spacing member is used.

Figure 9:
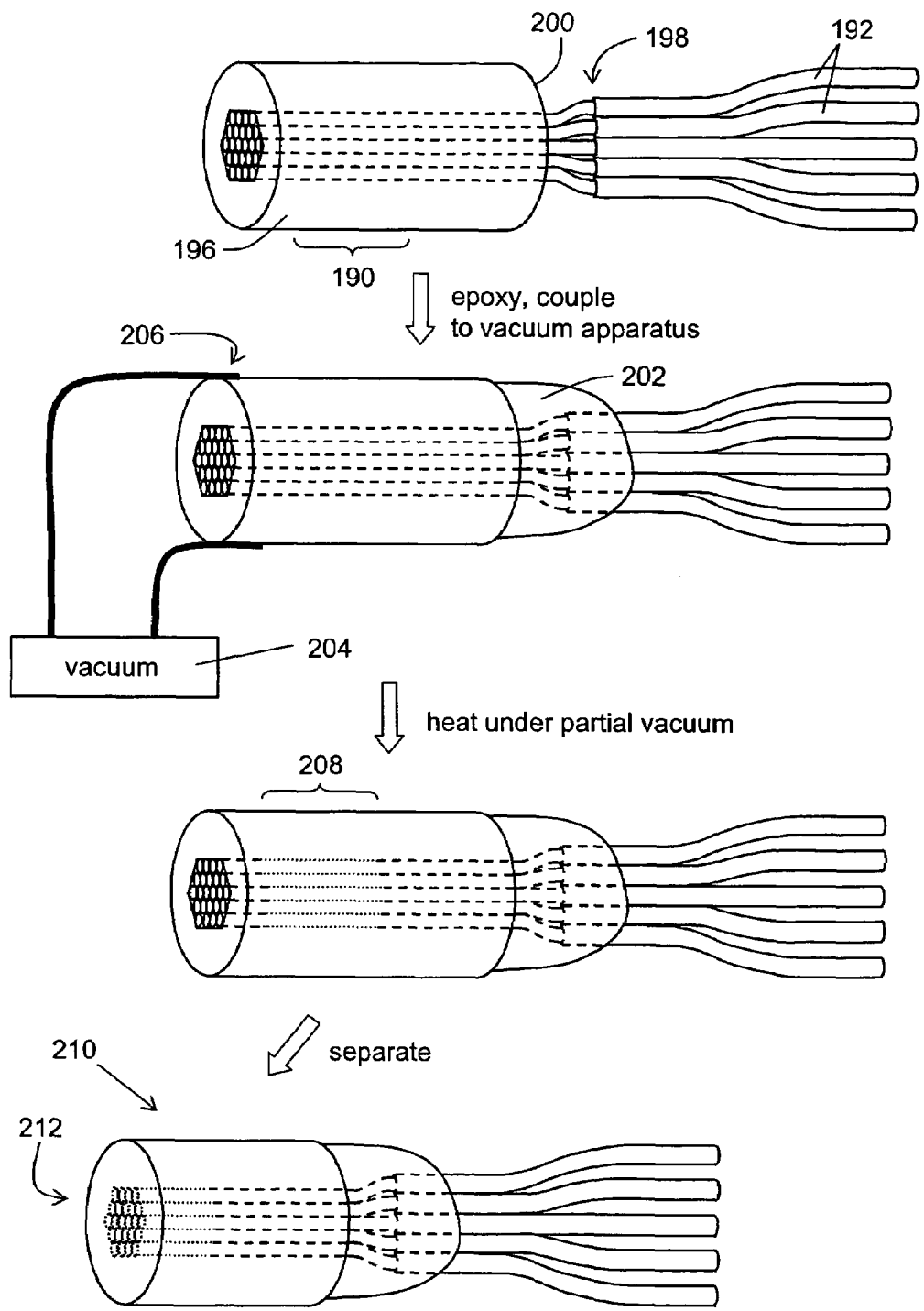
FIG. 9 is a schematic view of a method of heating a glass tube surrounding fusible segments of optical fibers under partial vacuum.

As described above, it may be desirable to remove the airspace among the optical fibers, the optional at least one spacing member, and the inner bore of the glass tube. In one desirable embodiment of the invention, the step of heating the glass tube is performed under partial vacuum, so that the structure collapses during heating and at least partially removes the airspace among the optical fibers, the optional at least one spacing member, and the inner bore of the glass tube. In certain desirable embodiments of the invention, the step of heating the glass tube is performed under partial vacuum, so that the structure fully collapses during heating, and substantially no airspace remains among the optical fibers, the optional at least one spacing member, and the inner bore of the glass tube. An example of a method for performing the step of heating of the glass tube under partial vacuum is shown in schematic view in FIG. 9. When the fusible segments 190 of optical fibers 192 are inserted into the inner bore 194 of glass tube 196, the stripped edges 198 of the optical fibers 192 are brought near the distal end 200 of the glass tube 196. A polymeric material 202 (e.g. an epoxy adhesive) is used to both seal the distal end 200 of glass tube 196, and to provide strain relief to optical fibers 192. A vacuum apparatus 204 is operatively coupled to proximal end 206 of glass tube 196, and a partial vacuum is pulled while the glass tube 196 is heated in the region surrounding the fusible segments 190 of optical fibers 192, thereby forming fused section 208. The skilled artisan can adjust the vacuum and heating conditions to provide partial or full collapse of the fused section of the fused fiber bundle, either partially or substantially removing the airspace among the optical fibers, the optional at least one spacing member, and the inner bore of the glass tube. For example, as shown in FIG. 9, after heating and separation, fused fiber bundle 210 has substantially no airspace remaining among the optical fibers and the glass tube, as evidenced by the substantially solid glass endface 212.

As the skilled artisan will appreciate, it can be a difficult task to insert several optical fibers of very small dimension (125 μm stripped diameter) with any optional spacing members into the inner bore of a glass tube adapted just to fit the optical fibers in a specified geometrical arrangement. The present invention includes methods to make fiber bundles that include methods for conveniently and precisely inserting optical fibers and optional spacing members into the inner bore of a glass tube. These methods will be useful in making fused fiber bundles, but will also be useful in making fiber bundles that are held together using something other than glass fusion (e.g., polymeric adhesive, sol-gel materials). As such, the optical fibers in these embodiments of the invention have affixible regions which are adapted to be affixed to the glass tube, to any optional spacing members, and to each other using the desired method of affixing. If the desired method of affixing the fiber bundle is glass fusion, then the general affixible segments are fusible segments, as described above.

Figure 10:
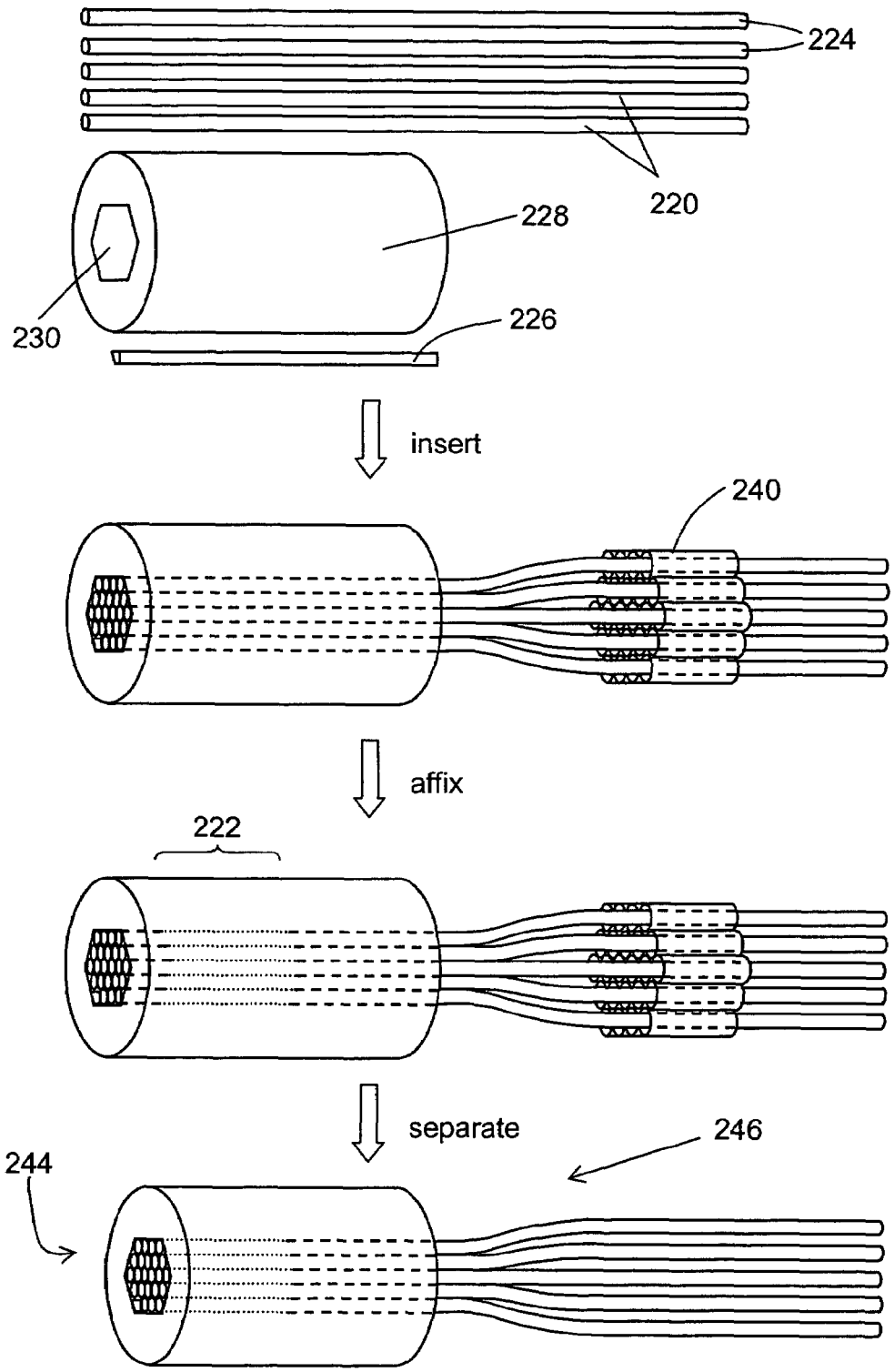
FIG. 10 is a schematic view of a method of making a fiber bundle using a cellular arrangement tool.

An embodiment of a method for making a fiber bundle according to the present invention is shown in schematic view in FIG. 10. A plurality of optical fibers 220, each having an affixible segment 222 and a distal end 224; optionally at least one spacing member 226; and a glass tube 228 having an inner bore 230 formed therein are provided. The inner bore 230 has a geometry adapted to closely fit the affixible segments 222 of the plurality of optical fibers 220 and the optional at least one spacing member 226. The affixible segments 222 of optical fibers 220 and the optional at least one spacing member are inserted through a cellular arrangement tool 240 and into the inner bore 230 of the glass tube 228 in a substantially parallel arrangement. The affixible segment 222 of each of the optical fibers 220 is then affixed to any adjacent optical fibers 220 and any adjacent optional spacing members 226, and the affixible segment 222 of each of the optical fibers 220 adjacent to glass tube 228 is affixed thereto, using a desired affixing method such as fusion, polymeric adhesive, or sol-gel materials, thereby forming an affixed region 242. Affixed region 242 is then separated to expose an endface 244, thereby forming the fused fiber bundle 246.

Figure 11:
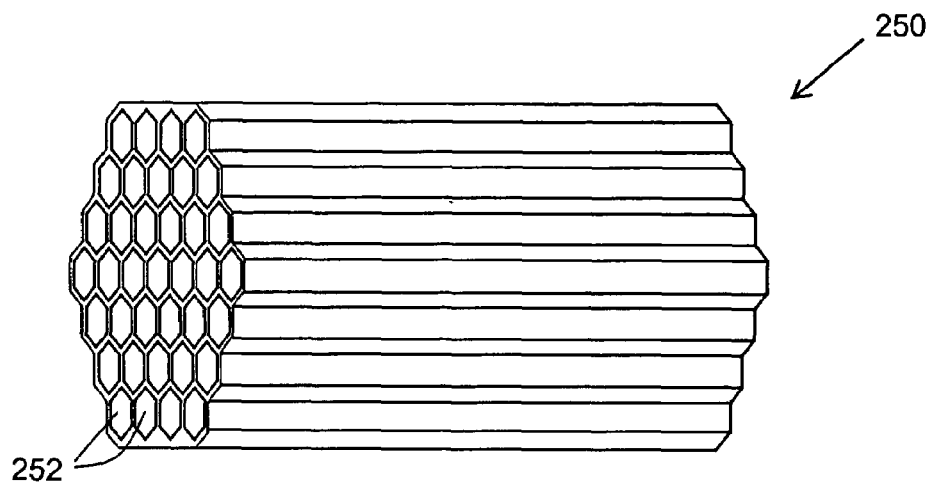
FIGS. 11 and 12 are schematic views of embodiments of cellular arrangement structures according to an embodiment of the present invention.
Figure 12:
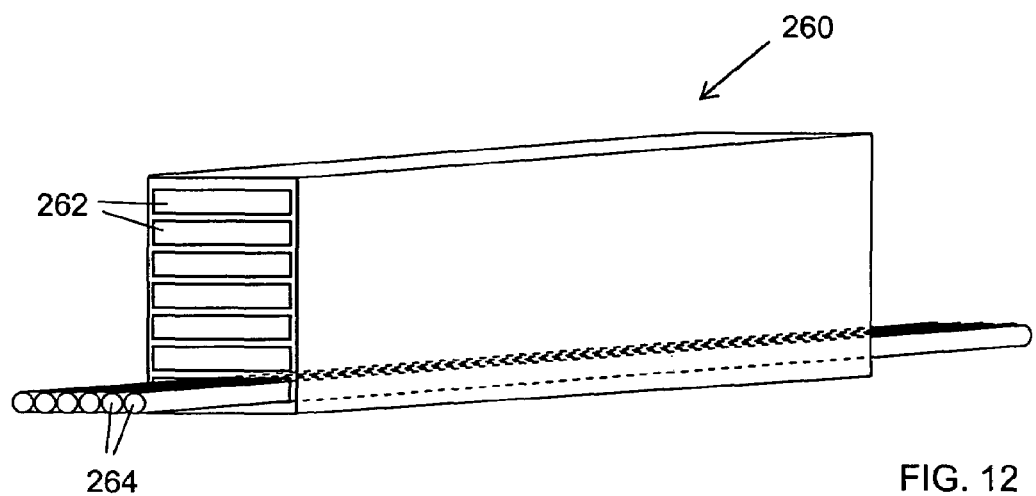

An example of a cellular arrangement tool is shown in FIG. 11. The cellular arrangement tool is adapted to provide the desired spatial arrangement to the plurality of optical fibers and optional spacing members. The cellular arrangement tool 250 has a plurality of parallel cells 252, each adapted to hold a single optical fiber in a desired arrangement. The cells 252 are desirably large enough to allow the optical fibers to slide freely through them; however, the skilled artisan may use a lubricating fluid such as isopropanol to ease the sliding of the optical fibers through the cellular arrangement tool. In desirable embodiments of the invention, the cells are large enough to fit coated optical fibers, so that much of the optical fibers can remain coated in the fiber bundle. The cellular arrangement tool 250 may be made in a variety of ways. For example, the skilled artisan can construct a cellular arrangement tool from arrayed hypodermic tubing. The cellular arrangement tool can be a cellular glass structure, made for example by adapting the stack-and-draw methods for making photonic band gap optical fibers described in U.S. Pat. Nos. 6,243,522; 6,260,388; 6,444,133; 6,445,862; and 6,468,374, each of which is incorporated herein by reference in its entirety. The cellular arrangement structure of FIG. 11 is configured so that each cell is adapted to fit a single optical fiber; however, the skilled artisan will appreciate that each cell of a cellular alignment structure can be adapted to fit more than one optical fiber. For example, the cellular arrangement structure 260 shown in schematic view in FIG. 12 has cells 262 adapted to fit rows of optical fibers 264. The cells of the cellular arrangement structure can be of any convenient or desirable cross-sectional shape, such as the round cells of cellular arrangement structure 240 of FIG. 10, or the hexagonal cells of cellular alignment structure 250 of FIG. 11.

Figure 13:
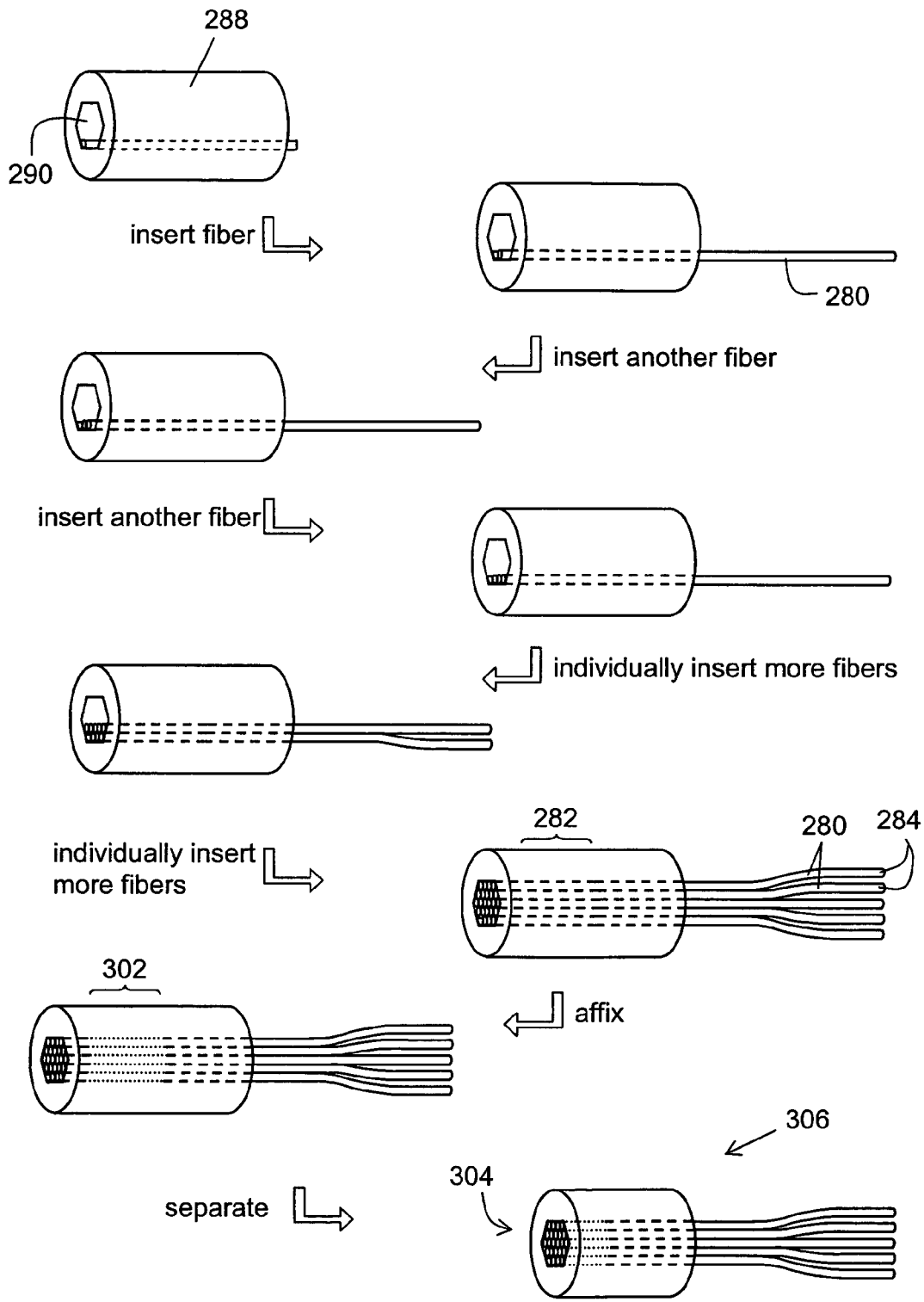
FIG. 13 is a schematic view of a method of making a fiber bundle using stepwise insertion of optical fibers.

Another embodiment of a method for making a fiber bundle according to the present invention is shown in schematic view in FIG. 13. A plurality of optical fibers 280, each having an affixible segment 282 and a distal end 284; optionally at least one spacing member 286; and a glass tube 288 having an inner bore 290 formed therein are provided. The inner bore 290 has a geometry adapted to closely fit the affixible segments 282 of the plurality of optical fibers 280 and the optional at least one spacing member 286. The affixible segments 282 of optical fibers 280 and the optional at least one spacing member are inserted into the inner bore 290 of the glass tube 288 in a substantially parallel arrangement in a plurality of sub-steps, wherein less than all of the affixible segments 282 of the optical fibers 284 are inserted in each sub-step. It may be desirable to only partially insert the affixable segments 282 into the inner bore 290 in the plurality of sub-steps, then after all of the affixible segments 282 are partially inserted, more fully insert them into the inner bore 290 as a group. The affixible segment 282 of each of the optical fibers 280 is then affixed to any adjacent optical fibers 280 and any adjacent optional spacing members 286, and the affixible segment 282 of each of the optical fibers 280 adjacent to glass tube 290 is affixed thereto, using a desired affixing method such as fusion, polymeric adhesive, or sol-gel materials, thereby forming an affixed region 302. Affixed region 302 is then separated to expose an endface 304, thereby forming the fiber bundle 306.

Dividing the step of insertion into a plurality of sub-steps can simplify the positioning of the affixible segments of the optical fibers in the inner bore of the glass tube. In one desirable embodiment of the invention, the affixible segments of the optical fibers are inserted individually into the inner bore; that is, in each sub-step, a single affixible segment of an optical fiber is inserted. It may be desirable in a plurality of sub-steps to insert a set of affixible segments of optical fibers only partially into the inner bore; then insert the set of affixible segments more fully into the inner bore as a group. Desirably, the set of affixible segments forms a row, and is more fully inserted in a row-wise fashion. As each row is inserted, it can form a set of pseudo-V-grooves to aid in aligning the next for of optical fibers. An example of row-wise insertion is described more fully in the Example, below.

Figure 14:
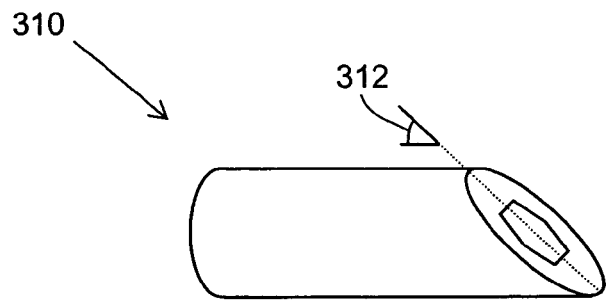
FIG. 14 is a schematic view of a beveled glass tube for use in a method according to one embodiment of the present invention.

In order to ease insertion of the affixible or fusible segments of the optical fibers into the inner bore of the glass tube, it may be desirable for the glass tube to be beveled, as shown in FIG. 14. The glass tube 310 desirably has a bevel angle 312 of between about 20° and about 70°. More desirably, the glass tube has a bevel angle between about 30° and about 60°. For example, the glass tube can have a bevel angle of about 45°.

Many embodiments of the present invention include the step of separating a fused or affixed region of a fiber bundle in order to present an endface. The skilled artisan will appreciate that many different methods can be used to effect the separation. For example, a fused or affixed region can be scored and broken, as is familiar in the optical fiber art. Alternatively, a dicing saw, laser machining, or heat can be used to effect the separation. The separation step will desirably include a polishing or grinding step to present a flat endface. The endface can be prepared at a non-perpendicular angle (e.g. 8-10°) and can be AR coated in order to reduce backrelection from the endface, as would be familiar to the skilled artisan.

The fiber bundles of the present invention can be coupled to optical systems in a variety of ways, as would be apparent to the skilled artisan. For example, the endfaces of the fiber bundles of the present invention can be butt-coupled to an optical source or detector, and can be affixed thereto with a suitably transparent adhesive. The endfaces of the fiber bundles of the present invention can be coupled to an optical fiber, for example, by fusion splicing. In many embodiments of the invention (e.g., where the refractive index of the glass tube is less than that of the claddings of the optical fibers), the endface of a tapered fiber bundle can be fusion spliced to an optical fiber without the use of a polymer overcoating to ensure the confinement of light. The endfaces of the fiber bundles of the present invention can also be operatively coupled to an optical system through free space, using, for example, a lens or a mirror.

Figure 15:
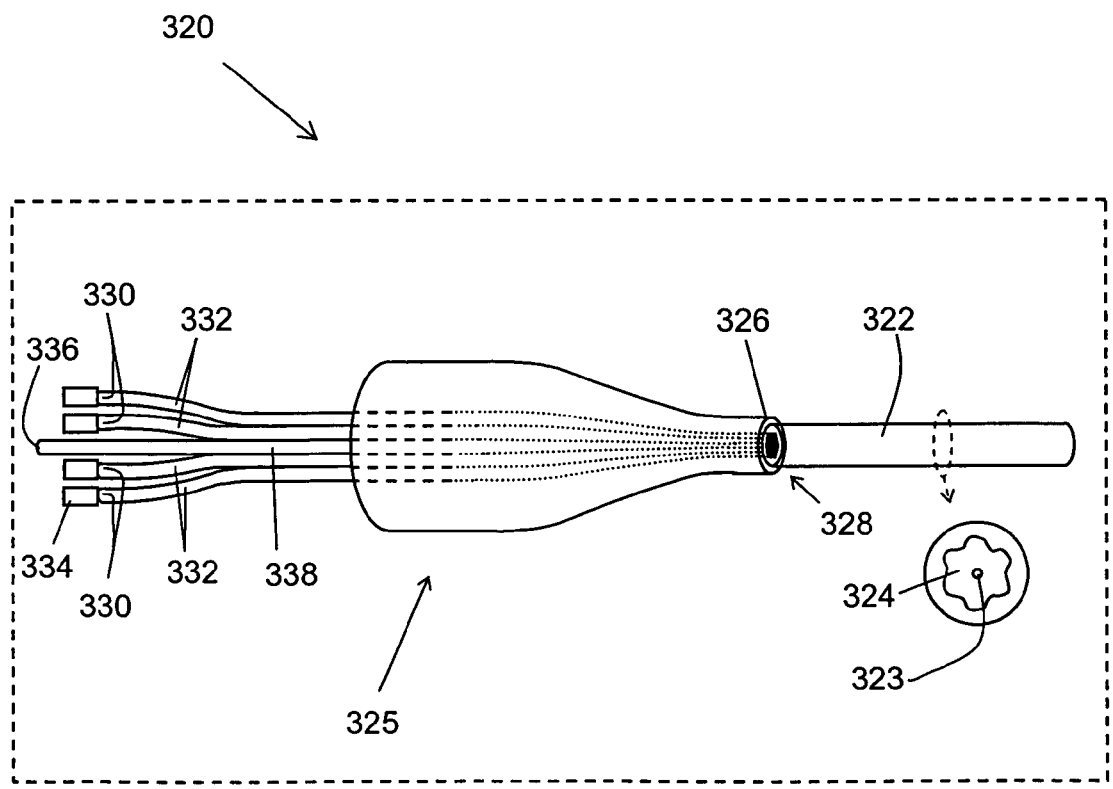
FIG. 15 is a schematic view of a cladding-pumped fiber device according to one embodiment of the present invention.

The fiber bundles of the present invention may be used in a variety of optical device. As such, one embodiment of the invention relates to an optical device including a fiber bundle substantially as described above operatively coupled to an optical system. The fiber bundles of the present invention may be advantageously used in devices using cladding-pumped fiber, such as cladding-pumped fiber amplifiers and cladding-pumped fiber lasers. In such devices, a fiber bundle substantially as described above is operatively coupled to a cladding-pumped fiber. For example, according to one embodiment of the invention, shown in a not-to-scale schematic view in FIG. 15, a cladding-pumped fiber device 320 includes a cladding-pumped fiber 322, and a fiber bundle 325. Cladding-pumped fiber 322 has a core 323 and an inner cladding 324, shown in cross-sectional view in the inset of FIG. 15. The fiber bundle can be any fiber bundle of the present invention as described hereinabove, but is desirably a fused fiber bundle. Desirably, the fiber bundle has a glass tube which has a refractive index less than the refractive index of the claddings of its optical fibers. The distal ends 330 of some of the optical fibers 332 of the fiber bundle may be coupled, for example, to optical sources 334 (e.g., semiconductor lasers), as shown in FIG. 15. The distal end 336 of the central optical fiber 338 of the fiber bundle may be a single mode optical fiber, and may be coupled to a source of an optical signal. The endface 326 of the fiber bundle 325 is coupled (e.g., by fusion splicing) to an end 328 of the cladding-pumped fiber. In the embodiment of FIG. 15, the central optical fiber 338 is coupled to the core 323 of the cladding-pumped fiber 320 through the endface of the fiber bundle, and the optical fibers 332 are coupled to the inner cladding 324 of the cladding-pumped fiber through the endface 326. Desirably, fiber bundle has substantially no organic material between neighboring optical fibers and between the optical fibers and the thick-walled tube, allowing the cladding-pumped fiber device to operate at relatively higher power. Cladding-pumped fiber devices are described in more detail in U.S. Pat. No. 5,864,644, which is hereby incorporated herein by reference in its entirety.

EXAMPLE

The present invention is further described by the following non-limiting example.

Twenty three coated multimode optical fibers (made from silica glass with dopants to control refractive index) were inserted into a cellular arrangement tool (about 15 mm wide) made using the stack-and-draw methods used to make photonic band gap fibers and having the irregular hexagonal geometry of fused fiber bundle 70 in FIG. 3, with cells large enough (~270 μm) to accommodate the coated optical fibers. The cellular arrangement tool was mounted on a movable stage (with possible adjustments in three linear dimensions and rotationally around the vertical axis). The glass tube (silica with about 6% boron dopant) had an inner bore with the irregular hexagonal geometry, just large enough to fit the 23 optical fibers (with a tolerance of ~1% or less), and was also mounted on a movable stage. The glass tube about 50 mm long, and was beveled at an angle of about 45°, and the cellular alignment tool was held at a slight angle to the glass tube. The cellular arrangement tool was mounted slightly higher than the glass tube, and microscope cameras were mounted above the cane and next to the cellular arrangement tool to aid in alignment.

Each optical fiber was individually inserted into the cellular arrangement tool, and its terminal segment stripped and cleaned, and then inserted into the inner bore of the glass tube. The insertion of optical fibers through the cellular arrangement tool and into the inner bore was performed one-at-a-time. The insertions were performed at first by hand, then the movable stages were used to finely align each optical fiber into place. Each optical fiber was individually inserted first just far enough to be supported (e.g., to a depth of about 100-300 μm measured from the intersection of the plane of the beveled endface of the glass tube and the plane of the fiber row); then when a complete row had been inserted partially, the row of optical fibers would be further inserted as a unit to a depth of an additional 100-600 μm. The inner bore and any previously inserted optical fibers held the fibers in place, due to the close tolerances of the inner bore, and once the a row of fibers was inserted, it formed a set of pseudo-V-grooves for the subsequent row of fibers. As each row was inserted, the height and angular differences between the cellular alignment tool and the glass tube were reduced, allowing the newly inserted optical fibers to be guided into place more easily by the previously inserted rows of optical fibers.

Once all of the optical fibers are inserted into the opening of the inner bore, they were fully inserted as a group by moving the cellular alignment tool and the glass tube toward each other, using isopropanol as a lubricant. The tight tolerances of the inner bore were sufficient to maintain alignment during this step. The optical fibers were inserted through the inner bore such that the stripped edge of each fiber was close to the distal edge of the glass tube, and a glass-filled, expansion-matched, low-shrinkage UV cured epoxy was applied and cured to affix the fibers to the distal edge of the glass tube, covering the bare glass regions of the optical fibers outside of the glass tube, and also sealing the distal edge of the glass tube.

The proximal end of the glass tube was attached to a vacuum apparatus, and the inner bore of the glass tube was placed under partial vacuum (~20 mm Hg), and the glass tube was heated over a distance of about 5 mm at the softening point of the glass for about 10 seconds to collapse the tube and fuse the structure. The collapsed region of the glass tube was cut (to give a final glass tube length of about 25 mm) and polished, then AR coated, forming the endface of the fused fiber bundle.

Figure 16:
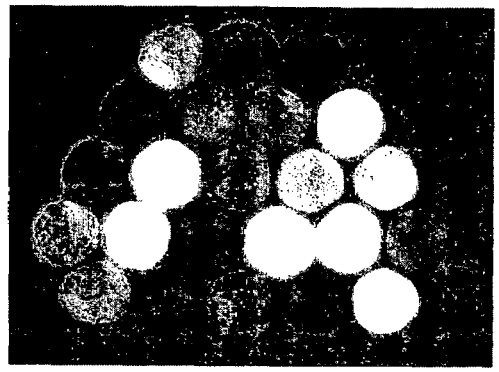
FIG. 16 is an end view of a fused fiber bundle according to the present invention.
Figure 17:
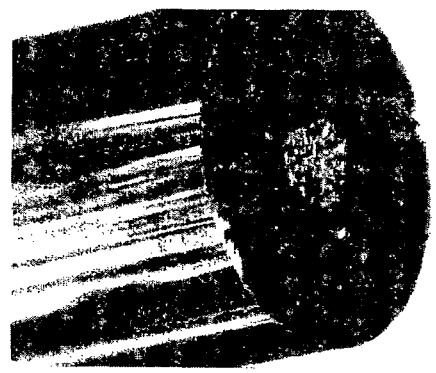
FIG. 17 is a side perspective view of the endface of a fused fiber bundle according to the present invention.
Figure 18:
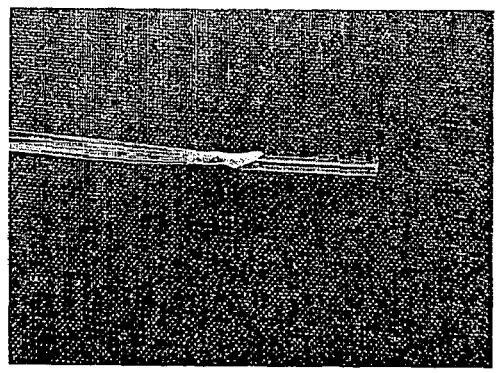
FIG. 18 is a side view of a fused fiber bundle according to the present invention.

The fused fiber bundle of this example is shown in end view in FIG. 16; in side perspective view in FIG. 17; and in side view in FIG. 18.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fused fiber bundle having a terminal section ending with an endface, the fused fiber bundle comprising:
    a glass tube;
    at least one spacer member having a selected shape inserted in the glass tube; and
    a plurality of optical fibers, each of the optical fibers having a terminal segment ending with a proximal end, and a distal end, said terminal segments being arranged between the glass tube and the at least one spacer member;
    wherein the glass tube surrounds the terminal segments of the optical fibers,
    wherein the terminal segments of the optical fibers are arranged substantially in parallel,
    wherein the terminal segment of each of the optical fibers is substantially fused to any adjacent optical fibers and the terminal segment of each optical fiber adjacent to the glass tube is substantially fused thereto, thereby forming the terminal section of the fused fiber bundle, and
    wherein the glass tube is a thick-walled tube, such that at the endface of the fused fiber bundle, the ratio of the cross-sectional area of the endface to the cross sectional area of the plurality of optical fibers is at least about 2.5.

2. The fused fiber bundle of claim 1, wherein the ratio of the cross-sectional area of the endface to the cross sectional area of the plurality of optical fibers is at least about 4.

3. The fused fiber bundle of claim 1, wherein the plurality of optical fibers comprises at least 4 optical fibers.

4. The fused fiber bundle of claim 1, wherein the plurality of optical fibers is in a triangular lattice.

5. The fused fiber bundle of claim 1, wherein the plurality of optical fibers is arranged in a geometry selected from the group consisting of diamond-shaped, triangular, hexagonal, trapezoidal and rectangular.

6. The fused fiber bundle of claim 1, wherein the terminal section of the fused fiber bundle has substantially no organic material between neighboring optical fibers and between the optical fibers and the thick-walled tube.

7. The fused fiber bundle of claim 1, wherein the optical fibers each include a core and a cladding, and wherein the refractive index of the glass tube is less than the refractive index of the claddings of the optical fibers.

8. The fused fiber bundle of claim 6, wherein the difference between the refractive index of the glass tube and the refractive index of the claddings of the optical fibers is at least 0.005.

9. The fused fiber bundle of claim 1, wherein the terminal section of the fused fiber bundle is collapsed so that substantially no airspace remains between neighboring optical fibers and between the optical fibers and the glass tube.

10. The fused fiber bundle of claim 1, wherein the distal ends of at least one of the optical fibers are lensed.

11. The fused fiber bundle of claim 1, wherein the optical fibers have rectangular cross-sections.

12. The fused fiber bundle of claim 1, wherein the terminal section of the fused fiber bundle ends in a taper.

13. The fused fiber bundle of claim 1, wherein the endface of the fused fiber bundle is polished.

14. The fused fiber bundle of claim 1, wherein the endface of the fused fiber bundle is greater than 0.78 mm$^2$ in cross-sectional area.

15. An optical device comprising the fused fiber bundle of claim 1 operatively coupled to an optical system.

16. A cladding-pumped fiber device, comprising the fused fiber bundle of claim 1 operatively coupled to a cladding-pumped fiber.

17. A fused fiber bundle having a terminal section ending with an endface, the fused fiber bundle comprising:
   a glass tube;
   at least one spacer member having a selected shape inserted in the glass tube; and
   a plurality of optical fibers, each of the optical fibers having a terminal segment ending with a proximal end, and a distal end, said terminal segments being arranged between the glass tube and the at least one spacer member;
   wherein the glass tube surrounds the terminal segments of the optical fibers,
   wherein the terminal segments of the optical fibers are arranged substantially in parallel, and are substantially fused to one another and to the glass tube to form the terminal section of the fused fiber bundle, and
   wherein the refractive index of the glass tube is less than the refractive index of the claddings of the optical fibers.

18. The fused fiber bundle of claim 17, wherein the difference between the refractive index of the claddings of the optical fibers and the refractive index of the glass tube is at least 0.005.

19. The fused fiber bundle of claim 17, wherein the terminal section of the fused fiber bundle is tapered.

20. The fused fiber bundle of claim 17, wherein the terminal section of the fused fiber bundle has substantially no organic adhesive between neighboring optical fibers and between the optical fibers and the glass tube.

21. The fused fiber bundle of claim 17, wherein the endface of the fused fiber bundle is greater than 0.78 mm$^2$ in diameter.

22. An optical device comprising the fused fiber bundle of claim 17 operatively coupled to an optical system.

23. A cladding-pumped fiber device, comprising the fused fiber bundle of claim 17 operatively coupled to a cladding-pumped fiber.

* * * * *